United States Patent [19]

Tsai

[11] Patent Number: 4,636,695

[45] Date of Patent: Jan. 13, 1987

[54] AC/DC ELECTRO-MAGNETIC DEVICE FOR AERATION PUMP IN FISH GLOBE OR THE LIKE

[76] Inventor: Shan F. Tsai, 2nd Fl., No. 20, Alley 7, Lane 23, Nanking E. Rd., Sec. 5, Taipei, Taiwan

[21] Appl. No.: 708,085

[22] Filed: Mar. 4, 1985

[51] Int. Cl.[4] .............................................. H02K 33/12
[52] U.S. Cl. ..................................... 318/124; 318/130; 310/29
[58] Field of Search ............... 318/122, 123, 124, 125, 318/127, 128, 130, 132, 245, 248, 252; 310/29, 32

[56] References Cited

U.S. PATENT DOCUMENTS

| 2,323,441 | 7/1943 | Baird | 318/124 |
| 3,336,488 | 8/1967 | Scott | 318/124 X |
| 3,668,491 | 6/1972 | Kelley et al. | 318/245 X |

Primary Examiner—Donovan F. Duggan
Attorney, Agent, or Firm—Wenderoth, Lind & Ponack

[57] ABSTRACT

An electro-magnetic device for an aeration pump for use in a fish tank or the like. The device includes a switch permitting the device to be operated with AC power, or with DC power and further, it can be operated with 120 V. or 240 V. AC. Upon being energized, the device will vibrate a vibrator member of a pump and the vibration strength can be varied with variable resistor.

15 Claims, 1 Drawing Figure

AC/DC ELECTRO-MAGNETIC DEVICE FOR AERATION PUMP IN FISH GLOBE OR THE LIKE

BACKGROUND OF THE INVENTION

The conventional aeration pump for a fish globe (fish tank) or the like has a drawback of generating vibrational noise, especially at night; therefore, the globe has a electro-magnet circuit connected in series with a resistor or diode to limit the current so as to damp the vibration of the vibrating rod, whereby the noise is suppressed.

The aforesaid electro-magnet of aeration pump usually uses a "U" or "E"-shaped iron core, of which the opening portion has more magnetic reluctance, i.e. has more magnetic flux loss. The iron core should be wound with more turns of enamel wire; otherwise, the coil is susceptible to breaking because of having less inductance to cause the wire to be overheated.

In order to prevent the coil from being burned out, the aforesaid "U" or "E"-shaped iron core, just like the small transformer iron core, needs more turns of enamel wire to increase its reactance; further, the iron core is furnished with windings for both 120 V and 240 V AC power.

In the past, some aeration pumps have been mounted with a toy motor operated with DC power for outdoor fishing or in case of a power outage; however, the brushes of that motor are susceptible to damage after a long period of operation; it may be good for a short time or provisional operation.

In the conventional fish globes and fishing spot, the aeration pump is operated with a motor that is to be driven with either AC power or a dry cell battery, and that motor cannot be operated conveniently with either AC or DC power through a selective switch.

In the prior art, some aeration pumps use DC power to operate a multi-vibrator for generating a square wave to energize the electro-magnet; however, the vibration frequency of the electromagnet is susceptible to variation in case of the voltage having any variation for example, the vibration frequency is 60 Hz when the DC power is 6 V, upon the DC power being reduced to a level less than 6 V., the vibration frequency will also be lowered. As a result, the vibration amplitude will be reduced, and driving power to the aeration pump will also be reduced considerably.

SUMMARY OF THE INVENTION

This invention provides an aeration pump for a fish globe or the like, particularly for an aeration pump with an AC/DC electromagnetic device, which comprises an ascillation circuit, a driving circuit, an electro-magnet, a speed regulating circuit, an AC/DC selective switch, and some diodes. The features of the present invention are that, upon the AC/DC selective switch being switched to its AC operation position, the vibration strength of the electromagnet may be controlled with the speed regulating circuit. Upon the AC/DC selective switch being switched to its DC position, DC power will be applied to the ascillation circuit to generate an AC signal, of which the frequency may be adjusted with a rheostat. That AC signal will be coupled to the driving circuit for amplification, before being applied to the electromagnet to generate vibration. The prime object of the present invention is to provide an aeration pump for a fish globe, and a portable aeration pump for a fisherman's convenience, since it can be operated with either AC or DC power.

DETAILED DESCRIPTION OF THE PREFERRED EMBODIMENT

Figure 1:
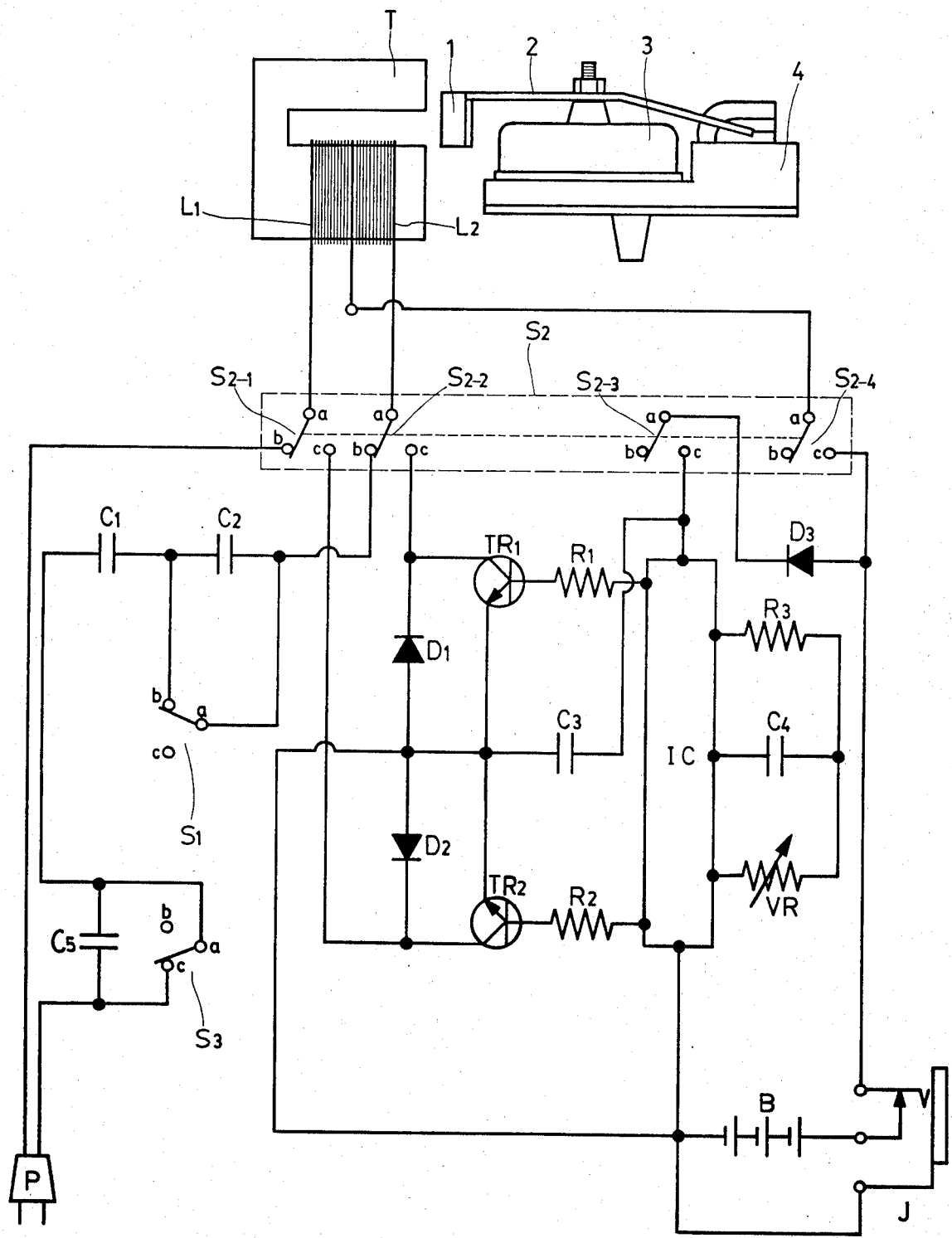
FIG. 1 is a schematic diagram of the present invention.

This invention relates to an AC/DC (alternating current/direct current) magnetic device for an aeration pump in a fish globe (fish tank) or the like, of which the structure includes two portions, a AC portion and a DC portion, which are described in detail, with reference to the drawing attached, as follows:

(1) DC portion: It includes an electromagnet with a tap in its coil, a driving circuit, an oscillation circuit, and a rectifier. The oscillation circuit generates an AC (alternating current) signal voltage, of which the frequency may be regulated with a rheostat; then, the signal will be amplified by the driving circuit so as to drive the loading coils L1 and L2 of an electromagnet T. The rectifier D3 is used for preventing current from a battery B or external DC power supply being reversely introduced into the circuit.

(2) AC portion: It includes the two loading coils L1 and L2 of electromagnet T, a speed regulating circuit, and a voltage regulating circuit. A speed regulating switch S1 together with capacitors C1 and C2 can provide two stages of speed, i.e., a high and a low speed. A voltage regulating switch S3 together with capacitor C5 can provide regulation of the input voltage.

The aforesaid AC power sources, 100 V AC and 6 V DC, all may be applied to the electromagnet.

The operating theory of the present invention is described as follows:

(1) In the speed regulating circuit, the capacitor is used for blocking the DC, and is used for passing the AC; the capacitance may be varied to control the current applied to the electro-magnet.

In an electro-magnet T using a power supply of 120 V AC and 240 V AC, the coil of the electro-magnet may be designed to use a power supply of 120 V AC; upon using 240 V AC as a power supply, the coil designed for using 120 V AC may just be connected with a capacitor in series.

(2) It is well known that, upon two capacitors having the same capacitance and being connected together in series, the total capacitance thereof will be reduced to one half ($\frac{1}{2}$) of one of the two capacitors; in other wards, the current flowing through the two capacitors will be one half of that of a single capacitor being used in the circuit.

(3) The circuit in FIG. 1 is further described as follows:

Upon the AC/DC selective switch S2 being turned to contact b, the loading coils L1 and L2 will be connected to each other in series, and a power supply 120 V. AC will be introduced, through plug P, into the circuit. After the power passing the speed regulating circuit that includes the speed regulating switch S1 and capacitors C1 and C2, the power will be introduced into the loading coils L1 and L2 of the electromagnet T to cause the electro-magnet to generate an alternating field, which will cause the magnet 1 and a vibration rod 2 to generate a vibration. Further the rubber cover 3 on the air pump 4 will also vibrate to generate a one-way flow of air. If it is necessary to damp the vibration, the speed regulating switch S1 is turned to contact to have capacitors C1 and C2 connected in series so as to reduce the current passing through therein. In turn, the current passing through the loading coils L1 and L2 of the electromagnet T will also be reduced to damp the vibration of the vibration rod 2; as a result, the speed of air flow will be reduced. Since the AC voltage is different from country to country, the voltage has to be regulated, if necessary, with a regulating circuit, which includes a voltage regulating switch S3 and a capacitor C5. Upon using a power supply pf 240 V. AC, the voltage regulating switch S3 should be turned to contact b so as to have capacitor C5 connected in series in the circuit. The vibration strength may be regulated with the speed regulating switch S1.

(4) In using DC power, the AC/DC selective switch S2 is turned to contact so as to have coil L1 of the electro-magnet connected to contact of switch S2-1 and then to the collector of transistor TR2. Simultaneously, the coil L2 will be connected to contact of switch S2-2, and then to the collector of transistor TR1. In that case, DC power is applied to the contacts a and of switch S2-4 and to the tap of the loading coils L1 and L2, which are connected to the collectors of transistors TR1 and TR2, respectively. The DC power will, through diode D3, also be applied to contacts a and of switch S2-3 and to the IC, of which the AC signal will, through resistors R1 and R2, be coupled to the bases of transistors TR1 and TR2 respectively. The collectors of transistors TR1 and TR2 will have an output of vibration signal respectively to cause the electromagnet T to generate an alternating field, which will make the magnet 1 on the front tip of the vibration rod 2 vibrate. As a result, the vibration rod 2 will also vibrate simultaneously. The diodes D1 and D2 are used for preventing the transistors TR1 and TR2 from being destroyed by the counter-EMF (electromotive force) generated by the loading coils L1 and L2.

I claim:

1. An AC/DC electromagnetic device for controlling an aeration pump for use in a fish tank or the like, the aeration pump having a vibrator member and having a magnetic member thereon, said device comprising:
    an electromagnet including a loading coil, for exerting magnetic forces on the magnetic member so as to vibrate the vibrator member upon excitation of said coil by an alternating current;
    DC power connecting means for electrically connecting said device to a source of DC power;
    oscillating signal generating means, connected to said DC power connecting means, for generating an oscillating signal;
    means, including a drive circuit, for driving current through said coil with said oscillating signal;
    a switching means for selectively electrically connecting said coil to a source of AC power or to said drive circuit; and
    first voltage dropping means for controlling the amplitude of a voltage supplied to said coil through said AC power connecting means.

2. A device as in claim 1, wherein said oscillating signal generating means includes a variable resistor for adjusting the frequency of said oscillating signal.

3. A device as in claim 1, wherein said oscillating signal generating means includes an oscillation circuit including at least one IC, at least one resistor and at least one capacitor, said device further comprising means, including a diode disposed so as to connect said oscillation circuit to said DC power connecting means when said coil is electrically connected to said drive circuit, for blocking reverse voltages from being applied to said IC through said DC power connecting means.

4. A device as in claim 1, wherein said DC power connecting means includes a jack connectable to a source of DC power.

5. A device as in claim 1, further comprising second voltage dropping means for reducing the current passing through said coil whereby the amplitude of vibration of said vibrator member can be reduced.

6. A device as in claim 5, wherein said second voltage dropping means includes two capacitors and a switch, connected to said switching means, said switch comprising means for selectively applying a higher voltage or a lower voltage to said coil.

7. A device as in claim 1, further comprising second voltage dropping means for reducing the current passing through said coil whereby the amplitude of vibration of said vibrator member can be reduced, said second voltage dropping means including two capacitors and a switch, connected to said switching means, said switch comprising means for selectively applying a higher voltage or a lower voltage to said coil, said DC power connecting means including a jack connectable to a source of DC power, said oscillating signal generating means including an oscillation circuit having at least one IC, at least one resistor and at least one capacitor, said device further comprising means, including a diode disposed so as to connect said oscillation circuit to said DC power connecting means when said coil is electrically connected to said drive circuit, for blocking reverse voltages from being applied to said IC through said DC power connecting means.

8. A device as claimed in claim 1, wherein said loading coil comprises two loading coils connected in series with a center tap, said center tap being connectable by said switch means to said DC power connecting means.

9. An aeration pumping device, comprising:
    an aeration pump including a vibrator member having a magnetic member thereon and means for pumping air in response to vibration of said vibrator member;
    an electromagnet including a loading coil adjacent said magnetic member, for exerting magnetic forces on said magnetic member so as to vibrate said vibrator member upon excitation of said coil by an alternating current;
    DC power connecting means for electrically connecting said device to a source of DC power;
    oscillating signal generating means, connected to said DC power connecting means, for generating an oscillating signal;
    means, including a drive circuit, for driving current through said coil with said oscillating signal;
    a switching means for selectively electrically connecting said coil to a source of AC power or to said drive circuit; and
    first voltage dropping means for controlling the amplitude of a voltage supplied to said coil through said AC power connecting means.

10. A device as in claim 9, wherein said oscillating signal generating means includes a variable resistor for adjusting the frequency of said oscillating signal.

11. A device as in claim 9, wherein said oscillating signal generating means includes an oscillation circuit including at least one IC, at least one resistor and at least one capacitor, said device further comprising means, including a diode disposed so as to connect said oscillation circuit to said DC power connecting means when said coil is electrically connected to said drive circuit, for blocking reverse voltages from being applied to said IC through said DC power connecting means.

12. A device as in claim 9, wherein said DC power connecting means includes a jack connectable to a source of DC power.

13. A device as in claim 9, further comprising second voltage dropping means for reducing the current passing through said coil whereby the amplitude of vibration of said vibrator member can be reduced.

14. A device as in claim 13, wherein said second voltage dropping means includes two capacitors and a switch, connected to said switching means, said switch comprising means for selectively applying a higher voltage or a lower voltage to said coil.

15. A device as in claim 9, further comprising second voltage dropping means for reducing the current passing through said coil whereby the amplitude of vibration of said vibrator member can be reduced, said second voltage dropping means including two capacitors and a switch, connected to said switching means, said switch comprising means for selectively applying a higher voltage or a lower voltage to said coil, said DC power connecting means including a jack connectable to a source of DC power, said oscillating signal generating means including an oscillation circuit having at least one IC, at least one resistor and at least one capacitor, said device further comprising means, including a diode disposed so as to connect said oscillation circuit to said DC power connecting means when said coil is electrically connected to said drive circuit, for blocking reverse voltages from being applied to said IC through said DC power connecting means.

* * * * *